United States Patent
Maron et al.

(10) Patent No.: US 6,439,055 B1
(45) Date of Patent: Aug. 27, 2002

(54) PRESSURE SENSOR ASSEMBLY STRUCTURE TO INSULATE A PRESSURE SENSING DEVICE FROM HARSH ENVIRONMENTS

(75) Inventors: Robert J. Maron, Cromwell; George J. Talmadge, Clinton; Bradley A. Currier, Guilford; Christopher T. Chipman, Scotland; Guy Daigle, Plainville; Richard M. Niezgorski, Milldale; Peter Gumprecht, Southington, all of CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 09/440,555

(22) Filed: Nov. 15, 1999

(51) Int. Cl.$^7$ .................................. G01L 9/00
(52) U.S. Cl. ....................................... 73/705
(58) Field of Search ..................... 356/4.09, 32, 345; 250/227.14, 227.18, 227.19, 227.21, 227.23, 227.27, 237 R, 237 G; 73/705, 800, 706; 367/149, 154, 166, 169, 171

(56) References Cited

U.S. PATENT DOCUMENTS

| | | | |
|---|---|---|---|
| 3,593,599 A | * 7/1971 | Dach | 74/869 |
| 3,625,062 A | 12/1971 | Heske | 73/398 |
| 3,795,109 A | * 3/1974 | Bojas et al. | 60/490 |
| 3,855,792 A | * 12/1974 | Bojas et al. | 60/421 |
| 4,509,370 A | 4/1985 | Hirschfeld | 73/705 |
| 4,636,031 A | 1/1987 | Schmadel, Jr. et al. | 350/96.19 |
| 4,704,151 A | 11/1987 | Keck | 65/4.1 |
| 4,727,730 A | 3/1988 | Boiarski et al. | 128/667 |
| 4,915,467 A | 4/1990 | Berkey | 350/96.15 |
| 4,932,263 A | 6/1990 | Wlodarczyk | 73/705 |
| 4,944,187 A | 7/1990 | Frick et al. | 73/733 |
| 4,948,217 A | 8/1990 | Keck et al. | 350/96.15 |
| 5,007,705 A | 4/1991 | Morey et al. | 350/96.29 |
| 5,042,898 A | 8/1991 | Morey et al. | 385/37 |
| 5,136,677 A | 8/1992 | Drexhage et al. | 385/123 |
| 5,187,983 A | 2/1993 | Bock et al. | 73/705 |
| 5,235,659 A | 8/1993 | Atkins et al. | 385/124 |
| 5,303,586 A | 4/1994 | Zhao | 73/293 |

(List continued on next page.)

FOREIGN PATENT DOCUMENTS

| | | | |
|---|---|---|---|
| DE | 19724528 | 12/1998 | |
| EP | 162303 | 4/1985 | |
| EP | 302745 | 8/1988 | |
| EP | 409447 | 7/1990 | |
| EP | 0359351 | 9/1992 | ........... C03B/37/15 |
| EP | 2299203 | 9/1996 | |
| NO | 305004 | 6/1997 | ........... G01L/11/02 |
| WO | WO8204328 | 12/1982 | |
| WO | WO9932911 | 3/1998 | ............ G02B/6/16 |
| WO | WO9944026 | 2/1999 | ............ G01L/9/00 |

OTHER PUBLICATIONS

M.G. Xu, . Geiger and J. P. Dakin for "Fibre grating pressure sensor with enhanced sensitivity using a glass–bubble housing"—Electronics Letters—Jan. 18, 1996 vol. 32, No. 2.

(List continued on next page.)

Primary Examiner—William Oen
(74) Attorney, Agent, or Firm—Howrey Simon Arnold + White, LLP

(57) ABSTRACT

A pressure sensor assembly for determining the pressure of a fluid in a harsh environment includes a pressure sensor suspended within a fluid filled housing. The assembly includes a pressure transmitting device which transmits the pressure of the fluid to sensor and maintains the fluid within the housing in a void free condition. The pressure sensor assembly maintains the sensor in a near zero base strain condition and further protects the sensor from shock and vibration. The pressure sensor assembly further includes bumpers that limit the movement of the sensor within the housing.

35 Claims, 2 Drawing Sheets

U.S. PATENT DOCUMENTS

| | | |
|---|---|---|
| 5,367,589 A | 11/1994 | MacDonald et al. ........... 385/37 |
| 5,399,854 A | 3/1995 | Dunphy et al. ......... 250/227.17 |
| 5,469,520 A | 11/1995 | Morey et al. .................. 385/37 |
| 5,511,083 A | 4/1996 | D'Amato et al. ............... 372/6 |
| 5,512,078 A | 4/1996 | Griffin .......................... 65/484 |
| 5,519,803 A | 5/1996 | Shiono et al. ............... 385/132 |
| 5,578,106 A | 11/1996 | Fleming, Jr. et al. ......... 65/391 |
| 5,612,778 A | 3/1997 | Hall et al. .................. 356/4.09 |
| 5,682,453 A | 10/1997 | Daniel et al. ................. 385/99 |
| 5,684,297 A | 11/1997 | Cable .................... 250/227.14 |
| 5,691,999 A | 11/1997 | Ball et al. ...................... 373/20 |
| 5,745,626 A | 4/1998 | Duck et al. ................... 385/96 |
| 5,767,411 A | 6/1998 | Maron .......................... 73/705 |
| 5,771,251 A | 6/1998 | Kringlebotn et al. ........... 372/6 |
| 5,841,131 A | 11/1998 | Schroeder et al. ..... 250/227.17 |
| 5,844,927 A | 12/1998 | Kringlebotn et al. ........... 372/6 |
| 5,877,426 A | 3/1999 | Hay et al. ..................... 73/733 |

OTHER PUBLICATIONS

Quartzdyne, Inc., Series QU/QG Spec Specification Sheet and p. 6, Section 1, General Information taken from Quartzdyne Pressure Transducers General Catalog and Operating Manual for Quartzdyne Downhole High Pressure Transducers (Series QU, QG, QL, TMC, 1XP and LP) Apr. 1, 1997.

"Design of DFB fibre lasers", V. C. Lauridsen et al, Electron. Lett., vol. 34, No. 21, pp. 2028–2030, 1998 No Month.

"Erbium doped fibre DFB laser with permanent $\pi/2$ phase–shift induced by UV post–processing", P. Varming et al, IOOC 95, Tech. Digest, vol. 5, PD1–3, 1995 No Date.

"The Thickness–Shear Quartz Resonator: A Rugged, Precision Pressure Transducer" Product Feature from SENSORS, Jul. 1990.

* cited by examiner

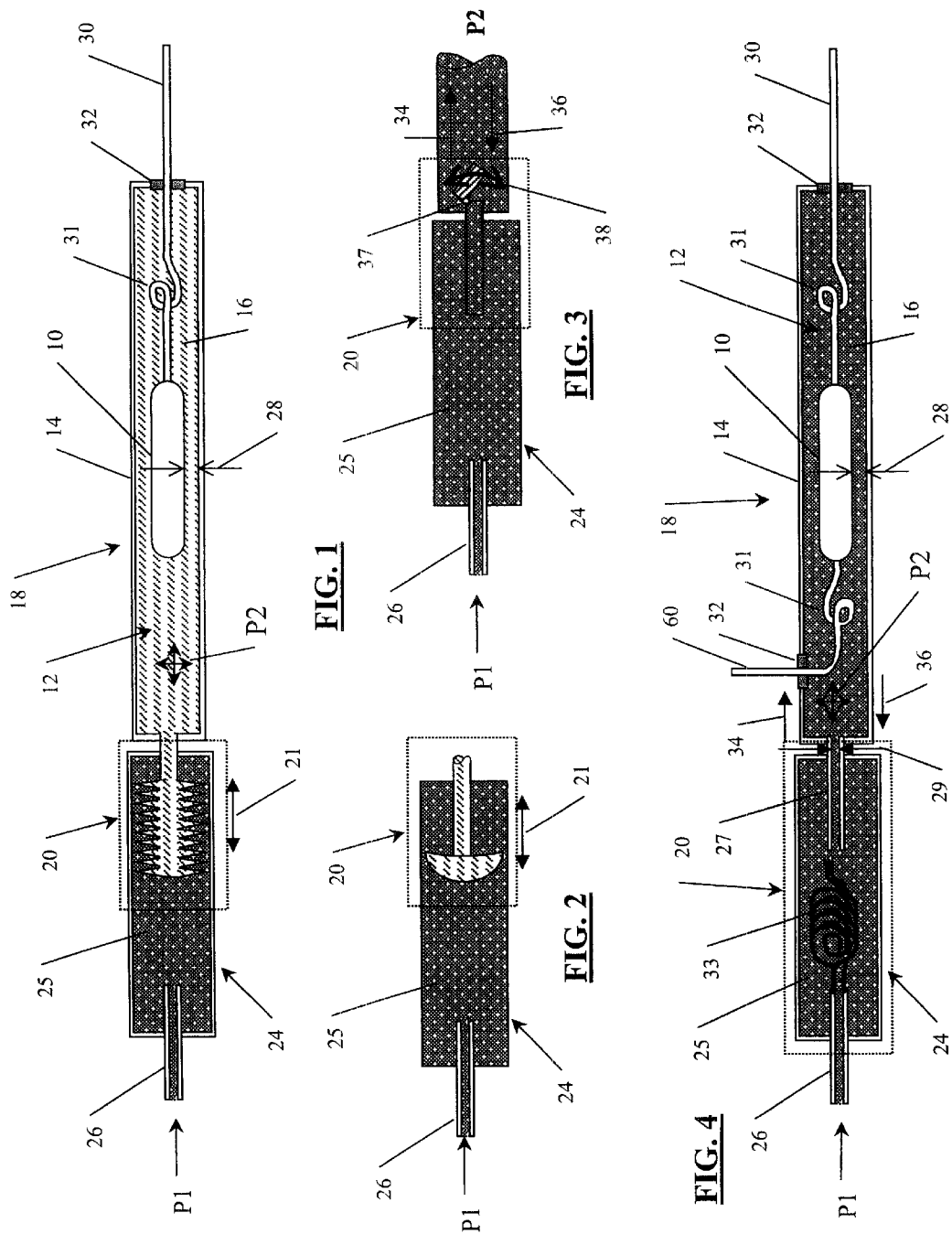

PRESSURE SENSOR ASSEMBLY STRUCTURE TO INSULATE A PRESSURE SENSING DEVICE FROM HARSH ENVIRONMENTS

CROSS REFERENCES TO RELATED APPLICATIONS

Copending U.S. patent application, U.S. patent application Ser. No. 9/205,944 entitled "Tube-Encased Fiber Grating Pressure Sensor" to T. J. Bailey et al., contains subject matter related to that disclosed herein.

TECHNICAL FIELD

This invention relates to pressure sensors, and more particularly to a pressure sensor for use in a harsh environment.

BACKGROUND ART

Sensors for the measurement of various physical parameters such as pressure and temperature often rely on the transmission of strain from an elastic structure (e.g., a diaphragm, bellows, etc.) to a sensing element. In a pressure sensor, the sensing element may be bonded to the elastic structure with a suitable adhesive.

It is also known that the attachment of the sensing element to the elastic structure can be a large source of error if the attachment is not highly stable. In the case of sensors that measure static or very slowly changing parameters, the long term stability of the attachment to the structure is extremely important. A major source of such long term sensor instability is a phenomenon known as "creep", i.e., change in strain on the sensing element with no change in applied load on the elastic structure, which results in a DC shift or drift error in the sensor signal. It is further known that most attachments transmit a base strain to the sensor through the attachment structure and that a true zero base strain sensitivity is difficult if not impossible to achieve.

One example of a fiber optic based sensor is that described in U.S. patent application Ser. No. 9/205,944 entitled "Tube-Encased Fiber Grating Pressure Sensor" to T. J. Bailey et al., which is incorporated herein by reference in its entirety. In that case, an optical fiber based sensor is encased within a tube and discloses certain embodiments wherein the sensor is suspended within a fluid. Some examples of such fiber optic sensors include sensors and tubes that are comprised of glass. A disadvantage of such sensors is that the glass is fragile, being brittle and sensitive to cracking. Thus the use of such a sensor in a harsh environment, e.g. where the sensor would be subject to significant levels of shock and vibration, presents a serious threat of damage to the fragile sensor. In certain environments such sensors are subject to shock levels in excess of 100 times the force of gravity (g) and vibration levels of 5 g RMS at frequencies typically ranging from about 10 Hz to about 200 Hz.

However, as discussed hereinbefore, sensor performance is closely tied to attachment techniques and to packaging of the sensor element as well. It is important to package such sensor elements to protect the fragile elements and not impede performance of the sensor in a manner that is reliable and inexpensive to manufacture.

SUMMARY OF THE INVENTION

Objects of the present invention include provision of a pressure sensor with minimal base strain and packaging for survival within a harsh environment.

The invention may be used in harsh environments (high temperature, and/or pressure, and/or shock, and/or vibration), such as in oil and/or gas wells, engines, combustion chambers, etc. In one embodiment, the invention may be an all glass fiber optic sensor capable of operating at high pressures (>15 kpsi) and high temperatures (>150° C.). The invention will also work equally well in other applications independent of the type of environment.

An object of the present invention includes a pressure sensor assembly for measuring a pressure of a first fluid in a harsh environment, wherein the pressure sensor assembly comprises a housing substantially filled with a void free second fluid having a pressure sensor disposed in the fluid within the housing. Attached to the housing is a pressure transmission device in fluid communication with the first fluid transmitting the pressure of the first fluid to the second fluid. The pressure sensor sensing a pressure indicative of the first fluid thereby. It is another object of the present invention to provide a pressure transmission device comprising a bellows, a pressure sensitive valve, an inlet tube having a predetermined inside diameter, or a diaphragm maintaining the second fluid in a void free condition. It is a further object of the present invention to provide for a buffer tube in fluid communication with first fluid.

It is yet another object of the present invention to provide a pressure sensor assembly which further comprises a pressure seal having an orifice disposed in the housing and a signal transmission cable coupled to the sensor extending through the orifice to the outside of the housing. Another object of the present invention provides that the signal transmission cable further comprises a strain relief portion between the seal and the sensing element to provide a near zero base strain for the sensor. It is still another object of the present invention to provide a pressure housing within which the pressure transmission device is disposed, and where the pressure housing is disposed in fluid communication with the first fluid. Another object includes an embodiment wherein the pressure transmission device maintains the second fluid above a predetermined minimum pressure.

It is yet a further object of the present invention to provide for the sensor to float within the second fluid within said housing, and further to provide for a bumper element disposed within the housing limiting movement of the sensor within the housing. It is yet another object to provide for a pair of said bumper elements positioned on the sensor and further to provide a pair of tangs positioned on an inside wall of the housing which cooperate with a pair of grooves positioned on the bumpers to limit the movement of said sensor within said housing. Another object of the invention provides for bumpers to be mounted to the housing and a pair of tangs mounted on the sensor, wherein the tangs cooperate with grooves in the bumpers to limit the movement of the sensor within the housing. It is yet another object of the present invention to provide for a fiber optic based sensor and a fiber optic transmission cable, and further to provide for a Bragg Grating based fiber optic sensor.

It is still further an object of the present invention to provide a pressure sensor for measuring a pressure of a fluid in a harsh environment wherein the pressure sensor comprises a housing substantially filled with the fluid and a pressure sensor disposed in the fluid within the housing and wherein a pressure transmission device disposed in the fluid and coupled to the housing. The pressure transmission device transmits the pressure of the fluid to the pressure sensor and maintains the fluid within the housing in a substantially void free condition and the pressure sensor senses a pressure indicative of fluid.

BRIEF DESCRIPTION OF THE DRAWINGS

FIG. 1 is a side view of a pressure sensor assembly, in accordance with the present invention;

FIG. 2 is a side view of an alternative embodiment of a pressure transmitting device, in accordance with the present invention;

FIG. 3 is a side view of an alternative embodiment of a pressure transmitting device, in accordance with the present invention;

FIG. 4 is a side view of an alternative embodiment of a pressure sensor in accordance with the present invention;

BEST MODE FOR CARRYING OUT THE INVENTION

Figure 5:
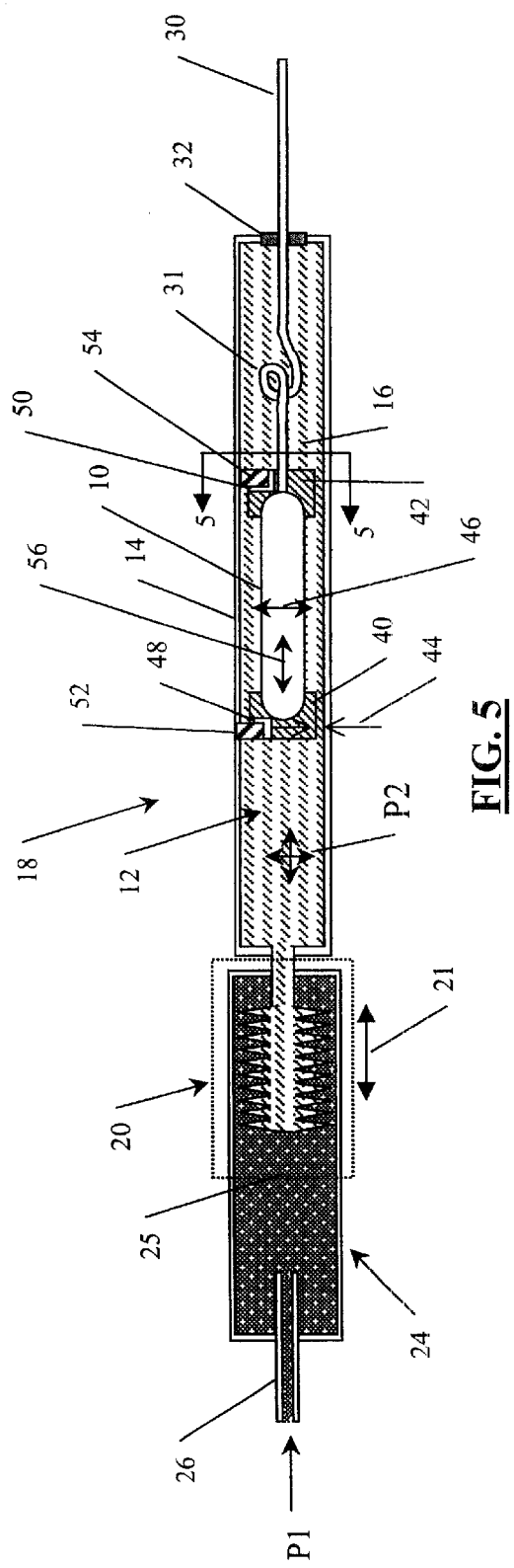
FIG. 5 is a side view of an alternative embodiment of a pressure sensor assembly, in accordance with the present invention.

Referring to FIG. 1, a pressure sensor 10, is disposed within a volume 12 partially defined by sensor housing 14 that is filled with a viscous fluid 16 to essentially "float" the sensor within the sensor housing to form a sensing assembly 18. The viscous fluid 16 "floats" sensor element 10 within sensor housing 14 providing fluid dampening to the sensor and allowing for uniform pressure distribution about the sensor. Sensing assembly 18 further comprises a pressure transmission device 20, such as a bellows, disposed within pressure housing 24 and in fluid communication with volume 12. Pressure transmission device 20 is exposed to a viscous fluid 25, which may be the same or different than viscous fluid 16, having a pressure of P1 entering pressure housing 24 through inlet 26 from a source (not shown). Pressure transmission device 20 reacts to pressure P1 in the direction indicated by arrow 21 and produces a corresponding pressure P2 within volume 12. Pressure P2 is a quasi-hydrostatic pressure that is distributed about pressure sensor 10 enabling the accurate determination of P1 as will be more fully described herein after. In certain embodiments, fluid 25 comprises those fluids typically encountered within an oil production well including oil, gas, water and air among others. Sensor housing 14 is filled with a fluid such as a viscous fluid, grease, silicone oil, or other fluids that provide shock and/or vibration isolation and prevent the sensor 10 from violently contacting the inner walls of the housing when subject to shock or vibration. In a particular embodiment of the present invention fluid 16 is comprised of a silicone oil, such as Dow Corning 200 Fluid, having a nominal viscosity of 200 centistokes.

Pressure transmission device 20 is coupled to volume 12 in such a way as to transmit the pressure P1 to volume 12 wherein there will be a corresponding pressure P2 sensed by pressure sensor 10. Further, pressure transmission device 20 may be configured to maintain fluid 16 in a relatively void free condition, but in any event maintains a minimum pressure within volume 12 and retains sensor 10 in a suspended, or floating, position as described hereinabove. The maintenance of this fluid filled, void free, condition in the present invention is also useful to protect sensor 10 from shock and vibration during shipping, deployment, and handling. Pressure transmission device 20 is shown in FIG. 1 as a bellows by way of example and may include any transmission or accumulator (or similar) device, as will be described herein after, that effectively transmits the pressure P1 to volume 12 while maintaining a volume 12 in a fluid filled, void free, condition at pressure P2. A change in source pressure P1 causes bellows 20 to react in the direction of arrow 21 changing the internal volume of the bellows and the pressure P2 within volume 12 thereby. An increase in pressure P1 decreases the internal volume of bellows 20 and increases the sensed pressure P2 and likewise a decrease in source pressure P1 increases the internal volume of the bellows thereby decreasing the sensed pressure P2. Bellows 20 has a maximum extension volume that maintains viscous fluid 16 at a predictable minimum quasi-hydrostatic pressure P2 suspending sensor 10 within volume 12 with average gap 28 between the sensor and sensor housing 14.

Depending on the specific application, volume 12 may be filled with fluid 16 with pressure transmission device 20 at full extension volume or some intermediate point. It will be appreciated that, depending on the desired operating range of the sensor assembly, the mechanical limitations of pressure transmission device 20, the ambient conditions, and the physical characteristics of fluid 16, that the extension volume of the pressure transmission device upon initial filling of volume 12 will determine the minimum pressure P2 that the sensor 10 will experience and accurately measure. In one embodiment, the pressure transmission device is initially filled along with volume 12 to a minimum pressure P2 of 1 psi. Volume 12 and pressure transmission device 20 may also be filled in a partial pressure atmosphere (i.e. a vacuum) or in a pressurized chamber depending on the application. The effect of the extension volume and ambient conditions are known characteristics of bellows and other pressure transmission devices and may be compensated for in determining the relationship between the source pressure P1 and the sensed pressure P2.

It is advantageous to provide sensing assembly 18 with a pressure transmission device 20, or other configuration as described herein below, that limits, or eliminates, the amount of flow of fluid 16 in and out (as well as within) sensor housing 14, necessary to effect an accurate pressure reading while providing an evenly distributed quasi-hydrostatic pressure within volume 12.

As described hereinabove viscous fluid 16 isolates sensor 10 from shock or vibration induced to sensor assembly 18 by maintaining average gap 28 and decouples the sensor 10 from the housing 14. By decoupling sensor 10 from the housing 14 the sensor assembly 18 of the present invention virtually eliminates base strain from the housing. By eliminating the base strain the present invention essentially achieves a zero base strain sensitivity. Pressure sensor 10 is exposed to pressure P2 and transmits a signal corresponding to the level of pressure of fluid 16 via transmission cable 30. In order to insure that the sensor 10 is free to float within housing 14 transmission cable 30 may be provided with a strain relief, or flexure portion 31 which creates a low stiffniess attachment between the sensor element 10 and its base structure, the housing 14. Although shown as a loop, flexure portion 31 may comprise any configuration that relieves attachment strain to sensor 10 such as a coil, serpentine arrangement, helix, or other similar flexible configuration. Transmission cable 30 passes through sensor housing 14 via pressure seal 32 and is routed to other sensors or to an instrumentation or interrogation system (not shown). Pressure sensor 10 may be any type of known pressure sensor benefiting from shock and vibration protection including, for example, a fiber optic pressure sensor such as that described in the afore mentioned U.S. patent application. In the case of a fiber optic based sensor element 10 transmission cable 30 may comprised one or more fiber optic cables. Other sensor types such as electronic, piezoelectric, or similar and their equivalents may also be used.

Sensor housing 14 is essentially a pressure shell and may be comprised of any material capable of withstanding the pressure P2, as well as the harsh and corrosive environment, depending on the application, such materials include stainless steel, Inconel, beryllium copper and other similar type materials. It is advantageous to provide a pressure shell with a shape and size that closely matches that of sensor 10 and minimizes the amount of fluid 16 required within the shell and minimizes the gap 28. Gap 28, as well as length and rotational allowances as will be more fully explained herein below, must be large enough to permit relatively free movement of the sensor 10 within the housing 14 to minimize shock and vibration transferred to the sensor. At the same time the gaps must be sized so that the sensor 10 does not overstress the strain relief 31 and the pressure seal 32. Sensor element 10 may contact housing 14 but the viscous nature of fluid 16 and the maintenance of a minimum pressure P2 combine to minimize the shock transferred to the sensor element.

Pressure housing 24 is a reservoir presenting fluid 25 at a pressure P1 to pressure transmission device 20. Fluid inlet 26 is connected to a fluid source (not shown) such as an oil production tube, for example, to allow fluid communication between the source and the pressure transmission device 20 and transferring pressure P1 to pressure sensor 10 thereby. Pressure housing 24 may be comprised of a material similar to that of sensor housing 14. In certain embodiments, pressure housing 24 may be coupled to an intermediate device, such as a buffer tube 33 (FIG. 4) for example, positioned between the source and the pressure housing to isolate the pressure transmission device from contaminants or dirt, for example. Alternatively, certain applications may allow pressure transmission device 20 to be inserted directly into the source of fluid 25 without the need for pressure housing 24 providing sufficient capillary action is available to maintain volume 12 at a predetermined minimum pressure as will be described more fully herein below with reference to FIG. 4.

Referring to FIG. 2 there is shown an alternative embodiment of a pressure transmission device 20. Pressure transmission device 20 comprises a diaphragm that transmits the pressure P1 to volume 12 while maintaining a fluid filled, void free, chamber 14 similar to that described herein above with reference to the bellows 20 (FIG. 1). A change in source pressure P1 causes diaphragm 20 to react in the direction of arrow 21 changing the internal volume of the diaphragm and the pressure P2 within volume 12 thereby. An increase in pressure P1 decreases the internal volume of diaphragm 20 and increases the sensed pressure P2 and a decrease in source pressure P1 increases the internal volume of the diaphragm thereby decreasing the sensed pressure P2. Diaphragm 20 also has a maximum extension volume that maintains viscous fluid 16 in a fluid filled, void free at a predictable quasi-hydrostatic pressure P2 floating sensor 10 within volume 12 with average gap 28 between the sensor and sensor housing 14.

Referring to FIG. 3 there is shown an alternative embodiment of a pressure transmission device 20. Pressure transmission device 20 comprises a pressure biased valve that transmits the pressure P1 to volume 12 while maintaining a predetermined minimum pressure P2. Valve 20 is shown in the open position and is biased in the closed position (not shown) with a biasing force provided by a spring hinge 37, for example, that is overcome once the predetermined minimum pressure P2 is reached. Valve 20 is shown as pivoting in the direction of arrow 38 between the open and closed position, however valve 20 may comprise any known type of pressure biased valve such as a check valve, slide valve, duck's bill, or other similar type valve. A change in source pressure P1 causes valve 20 to react in the direction of arrow 38 allowing fluid 25 to flow in and out of volume 12 and surround sensor 10 which senses pressure P1 directly. An increase in source pressure P1 above the predetermined minimum pressure P2 causes valve 20 to open and fluid 25 to flow into volume 12 in the direction indicated by arrow 34 raising the sensing pressure P2 to that of P1. A decrease in source pressure P1 will correspond with fluid 25 flowing from volume 12 in the direction of arrow 36. As P1 decreases fluid 25 will continue to flow from volume 12 until P1 equal P2 minimum whereupon valve 20 will close and maintain the volume at the predetermined minimum pressure described herein before. Although shown as a spring hinge valve, any check valve, duck's bill valve, or other similar or equivalent valve may be used without departing from the scope of the present invention.

Referring to FIG. 4 there is shown an alternative embodiment of a pressure sensing assembly 18 including an inlet tube 27 having an inside diameter 29 exposed to source pressure P1 and transmitting that pressure to housing 14. In the embodiment shown, fluids 25 and 16 may be the same fluid and expose sensor 10 to the pressure P2 that is equal to source pressure P1. It has been discovered, that for a given fluid 16 and a predetermined diameter 29 a sufficient capillary force is provided within inlet tube 27 to preclude fluid flow between pressure housing 24 and sensor housing 14 below some minimum pressure threshold. Once volume 12 of sensor housing 14 is filled with fluid 16 the capillary force provided by inlet tube 27 essentially prevents the flow of fluids between the sensor housing and pressure housing 24. Depending on the particular application, inlet 27 may comprise an extremely short length (where fluid 25 has a relatively high viscosity), resembling an orifice in housing 14 for example. In other applications, inlet 27 may be required to be quite long, and may be curved or sinuous in shape (where fluid 25 has a relatively low viscosity). In alternative embodiments inlet 27 may be exposed directly to a source without an intermediate pressure housing 24. In operation, fluid filled inlet tube 27 transmits the pressure P1 to volume 12 while maintaining a fluid filled, void free, chamber 14 similar to that described herein above with reference to the bellows 20 (FIG. 1). A change in source pressure P1 causes fluid 25 to directly transmit pressure P1 to fluid 16 resulting in a commensurate change in the sensed pressure P2 thereby. An increase in pressure P1 directly increases the sensed pressure P2 and a decrease in source pressure P1 directly decreases the sensed pressure P2 to some minimum pressure controlled by the capillary action of the inlet tube 27. An advantage of the embodiment shown in FIG. 4 is that there is no practical limitation to the capillary force in inlet tube 27 that maintains viscous fluid 16 in a fluid filled, void free at a predictable quasi-hydrostatic pressure P2 floating sensor 10 within volume 12 with average gap 28 between the sensor and sensor housing 14. As discussed herein before, it is advantageous to minimize flow in and out of sensor housing 14 in the directions indicated by arrows 34, 36. For this, as well as for other reasons, the present invention includes buffer tube 33 coupled to inlet 26. Buffer tube 33 may also be coupled to inlet 27 directly, or alternatively without departing from the scope of the present invention.

Figure 6:
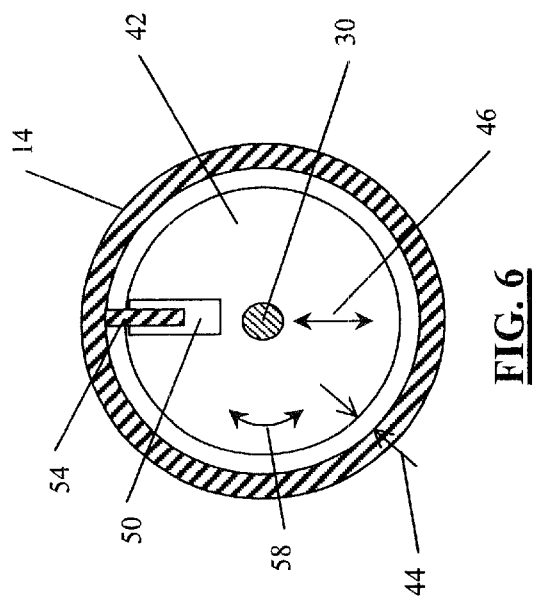
FIG. 6 is a cross sectional view of the pressure sensor assembly of FIG. 5 taken substantially along line 5—5.

Referring now to FIGS. 5 and 6 there is shown an embodiment of the present invention including bumper elements 40, 42 that are attached to and extend beyond the dimensions of sensor 10 to prevent the sensor from directly contacting housing 14. Bumper elements 40, 42 may be comprised of a suitable material, such as polyamide, epoxy, polymers, elastomers, Teflon®, Viton®, for example, and are sized to provide a predetermined clearance 44 between the bumpers and housing 14 allowing sensor 10 to float radially in the direction indicated by arrow 46 within the housing within the clearance dimension. The present invention further includes features to limit the motion of the sensor element 10 in a rotational and translational direction as best shown with reference to FIGS. 5 and 6. Bumper elements 40, 42 include slots 48, 50 that cooperate with housing mounted tangs 52, 54 to limit the translational movement of sensor 10 in the direction indicated by arrow 56 and further limits rotational movement of the sensor in the direction indicated by arrow 58. Bumpers 40, 42, and slots 48, 50 allow sensor 10 to float within volume 12 as described herein above within a limited envelope determined by the gaps between the bumpers and the housing 14 and the gaps between the tangs 48, 50 and the slots. Limiting the radial motion of the sensor 10 prevents the sensor from contacting the housing 14 directly as described herein before. Limiting the translational movement of sensor 10 reduces the amount of strain relief 31 needed to allow for float and further prevents sensor 10 from directly contacting the ends of housing 14. Further, limiting the rotational envelope of sensor 10 prevents the sensor from spinning within volume 12 and further reduces problems spinning would create with the transmission cable 30 and its attachment to the sensor. In alternative embodiments of the present invention bumpers 40, 42 are mounted to the housing 14 to limit the movement of sensor 10 within volume 12 similar to that described herein with reference to sensor mounted bumpers. It is also within the scope of the present invention that the bumpers would include a pair of grooves to cooperate with a pair of tangs in any radial arrangement about the housing. The viscous nature of fluid 16 and pressure P2 provides a fluid cushion between the sensor element 10 and the bumpers or limiters which reduces the shock transferred to the sensor element.

In operation, a sufficient volume of fluid 16 is degassed, as is known, to purge the fluid of entrapped air or voids (not shown). The degassed fluid 16 is introduced into volume 12 and pressure transmitting device 20 of the sensor assembly 18 of FIGS. 1–5, preferably without exposure to the atmosphere. The fluid 16 may be introduced into assembly 18 to a slight positive pressure with respect to the atmosphere to ensure that the assembly is fluid filled and void free. The pressure transmission device 20 (20 in FIG. 1 and 20 in FIG.2) may be positioned in a full extension volume during filling or may be partially compressed after filling as described hereinabove depending on the particular application. The void free, degassed fluid 16 ensures that sensor 10 floats within volume 12 and minimizes contact of the sensor (or bumpers 40, 42) with the walls of the housing 14.

Referring again to FIG. 4, sensor housing 14 includes a pass through arrangement. Transmission cable 30 enters the housing on one end as shown herein above and is coupled to the sensor 10. Transmission cable 60 is similarly coupled to sensor 10 and exits housing 14 via pressure fitting 32. Transmission cable 60 also includes a strain relief portion 31, shown as a loop, similar to that described herein above. The pass through arrangement allows multiplexing of a plurality of sensor assemblies 18 wherein transmission cables 30, 60 are similarly connected to other sensors. Alternatively, one or both, of the transmission cables 30, 60 may be connected to a signal processing system (not shown).

It should be understood that, unless otherwise stated herein, any of the features, characteristics, alternatives or modifications described regarding a particular embodiment herein may also be applied, used, or incorporated with any other embodiment described herein. Also, the drawings shown herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A pressure sensor assembly for measuring a pressure of a first fluid, comprising:
   a housing containing a second fluid;
   a fiber optic-based pressure sensing element disposed in the second fluid within the housing; and
   a pressure transmission device coupled to the housing and disposed in contact with the first fluid, wherein the pressure transmission device transmits the pressure of the first fluid to the second fluid and maintains the second fluid at a predetermined minimum pressure.

2. The pressure sensor assembly of claim 1, wherein the sensing element floats within the second fluid within the housing.

3. The pressure sensor assembly of claim 2, wherein the predetermined minimum pressure is sufficient to maintain the sensing element at a near zero base strain condition.

4. The pressure sensor assembly of claim 1, wherein the pressure transmission device comprises a bellows.

5. The pressure sensor assembly of claim 1, wherein the pressure transmission device comprises a pressure sensitive valve.

6. The pressure sensor assembly of claim 1, wherein the pressure transmission device comprises an inlet tube having a predetermined inside diameter.

7. The pressure sensor assembly of claim 1, wherein the pressure transmission device comprises a diaphragm.

8. The pressure sensor assembly of claim 1, further comprising a tube in fluid communication with the first fluid.

9. The pressure sensor assembly of claim 1, wherein the pressure sensor assembly further comprises:
   a seal disposed in the housing; and
   a signal transmission cable coupled to the sensing element and extending through the seal to the outside of the housing.

10. The pressure sensor assembly of claim 9, wherein the signal transmission cable further comprises a strain relief portion between the seal and the sensing element.

11. The pressure sensor assembly of claim 9, wherein the signal transmission cable comprises a fiber optic cable.

12. The pressure sensor assembly of claim 1, wherein the pressure transmission device is disposed within a pressure housing, and wherein the pressure housing is disposed in fluid communication with the first fluid.

13. The pressure sensor assembly of claim 1, wherein the pressure sensing element comprises a glass element.

14. The pressure sensor assembly of claim 1, wherein the pressure sensing element comprises a Bragg grating.

15. The pressure sensor assembly of claim 1, further comprising a bumper element disposed within the housing to limit movement of the sensing element within the housing.

16. The pressure sensor assembly of claim 15, wherein the bumper element is positioned on the sensing element.

17. The pressure sensor assembly of claim 1, wherein the pressure sensor assembly further comprises:
- at least one tang positioned on an inside wall of the housing;
- at least one bumper element positioned on the sensing element, the bumper element having a groove disposed therein; and
- wherein the groove cooperates with the tang to limit the movement of the sensing element within the housing.

18. The pressure sensor assembly of claim 1, wherein the pressure sensor assembly further comprises:
- at least one tang positioned on the sensing element;
- at least one bumper element positioned on an inside wall of the housing, the bumper element having a groove disposed therein; and
- wherein the groove cooperate with the tang to limit the movement of the sensing element within the housing.

19. The pressure sensor assembly of claim 1, wherein the second fluid is void free.

20. A pressure sensor assembly for measuring a pressure of a fluid, comprising:
- a housing containing the fluid;
- a fiber optic-based pressure sensing element disposed in the fluid within the housing;
- a pressure transmission device coupled to the housing and disposed in contact with the fluid, wherein the pressure transmission device transmits the pressure of the fluid to the pressure sensing element and maintains the fluid at a predetermined minimum pressure.

21. The pressure sensor assembly of claim 20, wherein the fluid maintains the sensing element at a near zero base strain condition.

22. The pressure sensor assembly of claim 20, wherein the pressure transmission device comprises an inlet tube having a predetermined inside diameter.

23. The pressure sensor assembly of claim 20, wherein the pressure transmission device comprises a pressure sensitive valve.

24. The pressure sensor assembly of claim 20, further comprising a tube in fluid communication with the fluid.

25. The pressure sensor assembly of claim 20, wherein the pressure sensor assembly further comprises:
- a seal disposed in the housing; and
- a signal transmission cable coupled to the sensing element and extending through the seal to the outside of the housing.

26. The pressure sensor assembly of claim 25, wherein the signal transmission cable further comprises a strain relief portion between the seal and the sensing element.

27. The pressure sensor assembly of claim 25, wherein the signal transmission cable comprises a fiber optic cable.

28. The pressure sensor assembly of claim 20, wherein the pressure transmission device is disposed within a pressure housing, and wherein the pressure housing is disposed in fluid communication with the fluid.

29. The pressure sensor assembly of claim 20, wherein the pressure transmission device maintains the fluid within the housing substantially void free.

30. The pressure sensor assembly of claim 20, wherein the sensing element floats within the fluid within the housing.

31. The pressure sensor assembly of claim 20, further comprising a bumper element disposed within the housing to limit movement of the sensing element within the housing.

32. The pressure sensor assembly of claim 31, wherein the bumper element is positioned on the sensing element.

33. The pressure sensor assembly of claim 20, wherein the pressure sensor assembly further comprises:
- at least one tang positioned on an inside wall of the housing;
- at least one bumper element positioned on the sensing element, the bumper element having a groove disposed therein; and
- wherein the groove cooperates with the tang to limit the movement of the sensing element within the housing.

34. The pressure sensor assembly of claim 20, wherein the pressure sensor assembly further comprises:
- at least one tang positioned on the sensing element;
- at least one bumper element positioned on an inside wall of the housing, the bumper element having a groove disposed therein; and
- wherein the groove cooperate with the tang to limit the movement of the sensing element within the housing.

35. The pressure sensor assembly of claim 20, wherein the pressure sensing element comprises a Bragg grating.

* * * * *